April 7, 1936.  H. E. HODGSON  2,036,477
ELECTROMAGNETIC CLUTCH
Filed Oct. 20, 1934
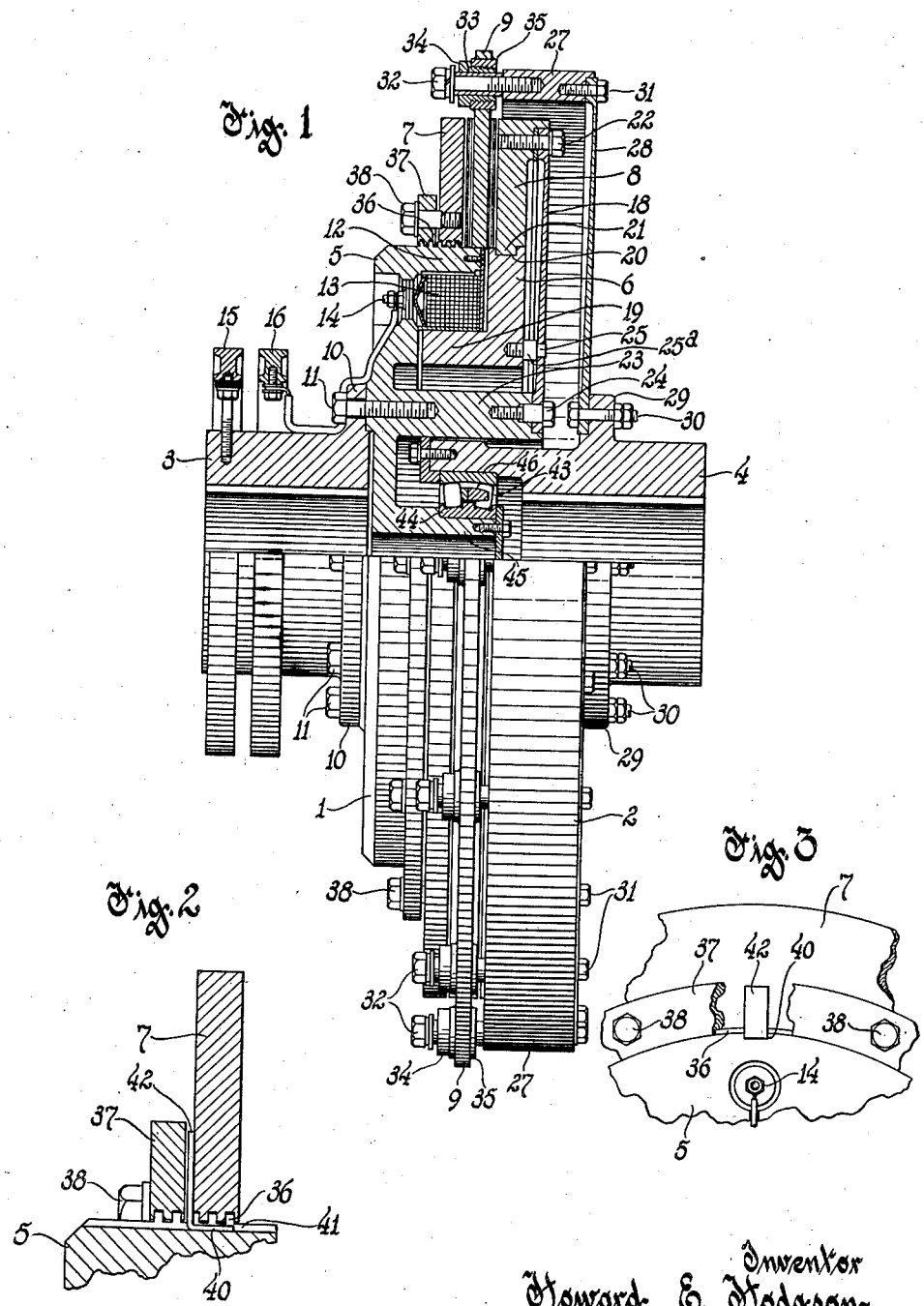
Inventor
Howard E. Hodgson
By Frank H. Hubbard
Attorney Patented Apr. 7, 1936

2,036,477

UNITED STATES PATENT OFFICE 2,036,477

ELECTROMAGNETIC CLUTCH

Howard E. Hodgson, Wauwatosa, Wis., assignor to Cutler-Hammer, Inc., Milwaukee, Wis., a corporation of Delaware Application October 20, 1934, Serial No. 749,195

5 Claims. (Cl. 192—84)

This invention relates to improvements in electromagnetic clutches.

Electromagnetic clutches are commonly provided with cooperating friction rings certain of which are adjustable to compensate for wear of the friction faces of the clutch and to also provide for adjustment of the air gap of the operating magnet. In clutches of this character it has heretofore been proposed to thread one of the friction rings upon the periphery of one of the magnetic parts and in practice this arrangement has been found desirable since it is merely necessary to rotate the threaded friction ring with respect to its associated magnet part to effect uniform axial adjustment thereof. However, tapered adjusting threads were heretofore employed in clutches of this type and as a result it has been found that such clutches were open to various objections. For example, it has been found that the heat generated in the friction faces of such clutches causes considerable expansion of the threaded friction ring with respect to its associated magnet part and where tapered adjusting threads are employed the threaded friction ring is loosened upon its associated magnet part. Thus the threaded friction ring is likely to tilt with respect to its associated magnet part and cause misalignment of the cooperating friction faces.

The present invention has among its objects to provide an improved electromagnetic clutch of the character above described having its parts constructed and arranged to insure against misalignment of the cooperating friction faces.

Another object is to provide an electromagnetic clutch of the aforesaid character having improved clamping means associated therewith for preventing rotation of the adjustable friction ring upon its associated magnet member.

Various other objects and advantages of the invention will hereinafter appear.

The accompanying drawing illustrates an embodiment of the invention which will now be described, it being understood that various modifications may be made in the embodiment illustrated without departing from the spirit and scope of the appended claims.

In the drawing,

Figure 1 is a side view of a clutch embodying the invention, the upper half of the clutch being shown in section, and Figs. 2 and 3 are enlarged fragmentary views of certain of the parts shown in Fig. 1.

The clutch illustrated in Fig. 1 includes a driving element 1 and a driven element 2, said elements being provided with hubs 3 and 4 to be secured respectively to adjacent ends of a driving and a driven shaft. Driving element 1 includes a circular field member 5 and a circular armature member 6, the former having a friction ring 7 adjustably mounted thereon and the latter having a friction ring 8 fixed thereto. Driven element 2 includes a friction ring 9 to be clamped between the friction rings 7 and 8 upon attraction of armature member 6 by field member 5, to establish a driving connection between the driving and driven shafts.

More specifically, field member 5 is fixed to a projecting flange 10 on hub 3 by bolts 11. Said field member is provided with a peripheral pole projection 12, and as hereinafter set forth friction ring 7 is threaded upon the periphery of said pole projection to provide for axial adjustment thereof. An annular magnet coil 13 is mounted within pole projection 12, said coil being wound upon a suitable bobbin which is fixed to field member 5. Coil 13 is provided with a pair of terminals, one of which is illustrated at 14 and said terminals are connected to insulated slip rings 15 and 16 mounted upon hub 3.

Armature member 6 is mounted within friction ring 8 and said friction ring is secured to field member 5 through the medium of a spring disk 18. Armature member 6 is provided with an annular pole projection 19 which projects into the opening in coil 13 and the same has a groove 20 on the periphery thereof for receiving a projection 21 on the inner edge of the friction ring 8. Friction ring 8 is divided into two parts to permit assembly thereof upon the armature member 6 and the outer edge of spring disk 18 is secured to said friction ring by bolts 22, while the inner edge of said disk is secured to an annular projection 23 on field member 5 by bolts 24. In order to determine the air gap between armature member 6 and field member 5 when the clutch is released said armature member is provided with a plurality of threaded stop pins 25. The pins 25 extend through openings in spring disk 18 and are provided with shoulder portions 25ª which engage the left hand face of said spring disk to normally hold armature member 6 in a given position with respect to said disk.

Friction ring 9 has friction linings secured to opposite faces thereof and the same is mounted upon a ring member 27 carried by a spring disk 28 which is secured to hub 4. Spring disk 27 is secured adjacent its inner edge to a flange 29, on hub 4, by bolts 30 and ring member 27 is secured to said disk adjacent the periphery thereof by bolts 31. Friction ring 9 is slidably mounted upon a plurality of cap screws 32 carried by ring member 27. Each of the cap screws 32 has a bushing 33 associated therewith which is clamped between the head thereof and the left hand face of ring member 27 and each of said bushings is slidable within an opening in a plug 34. The plugs 34 are screwed within bushings 35 and said bushings are secured by welding within openings in friction ring 9. In connection with the foregoing it should be noted that the bushings 33 and plugs 34 can be readily renewed when the same become worn.

As is apparent from the foregoing, it is necessary in order to effect clamping of friction ring 9 between friction rings 7 and 8 to adjust friction ring 7 axially with respect to field member 5 so that an air gap is maintained between said field member and armature member 6 when said armature member moves into its attracted position. To effect such adjustment of friction ring 7 the interior thereof is threaded to fit a square screw thread 36 on the periphery of pole projection 12. Also clamping means is provided for preventing rotation of friction ring 7 upon the screw thread 36. Such clamping means comprises a ring nut 37 threaded to fit upon the screw thread 36 and a plurality of cap screws 38 closely fitting within openings in said nut and threaded into friction ring 7. Ring nut 37 is located to the left of friction ring 7 and is spaced therefrom, and it should be noted that upon tightening of the cap screws 38 the thread on said friction ring is forced against the thread 36 on field member 5 in the direction of the thrust imposed upon said ring upon energization of the clutch. Ring nut 37 is so constructed that upon tightening of cap screws 38 the same yields slightly to provide a yielding pressure on said screws which tends to prevent loosening thereof. As is apparent, upon loosening of the cap screws 38 the friction ring 7 and its associated ring nut 37 can be readily rotated with respect to field member 5 to effect uniform axial adjustment of said ring.

In connection with the foregoing it should be noted that the aforedescribed screw mounting for friction ring 7 insures against tilting thereof with respect to field member 5 upon expansion of said ring with respect to said field member due to heat generated in the friction faces of the clutch. As is apparent, upon expansion of friction ring 7 with respect to field member 5 the side faces of the threads on these parts are held in engagement to maintain the face of said friction ring at right angles to the axis of said field member to thereby prevent misalignment of the cooperating clutch faces.

The friction ring 7 is also preferably provided with locking means which acts to prevent damaging of the clutch upon failure of the aforedescribed clamping to hold said friction ring in its adjusted position. Such locking means comprises a key 40 located within a keyway 41 in the periphery of field member 5. As shown in Figs. 2 and 3 key 40 is provided with an outwardly projecting portion 42 which is located between friction ring 7 and ring nut 37. As is apparent, upon failure of the aforedescribed clamping means to hold friction ring 7 in its adjusted position, the portion 42 of key 40 is adapted to cooperate with the screws 38 on opposite sides thereof to permit only a slight degree of rotation of said friction ring with respect to field member 5. In the embodiment illustrated in Fig. 1 the driving and driven elements are held in centered relation by a roller bearing 43 having an inner race 44 fixed to an axially extending projection 45 on field member 5 and an outer race 46 which fits within a counter bore in the left hand end of hub 4.

What I claim as new and desire to secure by Letters Patent is:

1. An electromagnetic clutch or the like, comprising a magnet having cooperating field and armature members and a plurality of cooperating friction members associated with said magnet members, one of said friction members being threaded upon the periphery of one of said magnet members to provide for adjustment thereof, the threads on said members having engaging right helicoid faces.

2. An electromagnetic clutch or the like, comprising a circular magnet having cooperating field and armature members, a plurality of cooperating friction rings associated with said magnet members, one of said friction rings being threaded upon the periphery of one of said magnet members to provide for axial adjustment thereof, the engaging threads on said members being of square shape to insure against misalignment of said last mentioned friction ring upon expansion thereof with respect to its associated magnet member.

3. An electromagnetic clutch or the like, comprising a circular magnet having cooperating field and armature members, a plurality of cooperating friction rings associated with said magnet members and adapted to be brought into engagement upon energization of said magnet, one of said friction rings being threaded upon the periphery of said field member to provide for axial adjustment thereof, the engaging threads on said field member and its associated friction ring being of square shape, a ring member also threaded upon the periphery of said field member and a plurality of clamping screws associated with said ring member for engaging said threaded friction ring to prevent rotation of the same with respect to said field member.

4. An electromagnetic clutch or the like, comprising a circular magnet having cooperating field and armature members, a plurality of cooperating friction rings associated with said magnet members and adapted to be brought into engagement upon energization of said magnet, one of said friction rings being threaded upon the periphery of said field member to provide for axial adjustment thereof, the engaging threads on said field member and its associated friction ring being of square shape, a ring member also threaded upon the periphery of said field member, and a plurality of clamping screws mounted upon said ring member for engaging said threaded friction ring to prevent rotation of the same with respect to said field member, said clamping screws being adapted to impose a thrust on said threaded friction ring which is in the direction of the thrust imposed thereon upon energization of said magnet.

5. In an electromagnetc clutch or the like, the combination with a magnet having cooperating field and armature members of a plurality of cooperating friction parts associated with said members to be engaged and disengaged by relative axial movements of said magnet members, one of said friction parts being threaded upon the periphery of one of said magnet members to provide for axial adjustment thereof with respect to said magnet member, the threads on said friction part and said magnet member having engaging right helicoid faces, and clamping means associated with said friction part for holding the same in adjusted position upon said magnet member.

HOWARD E. HODGSON.